Figure 2:
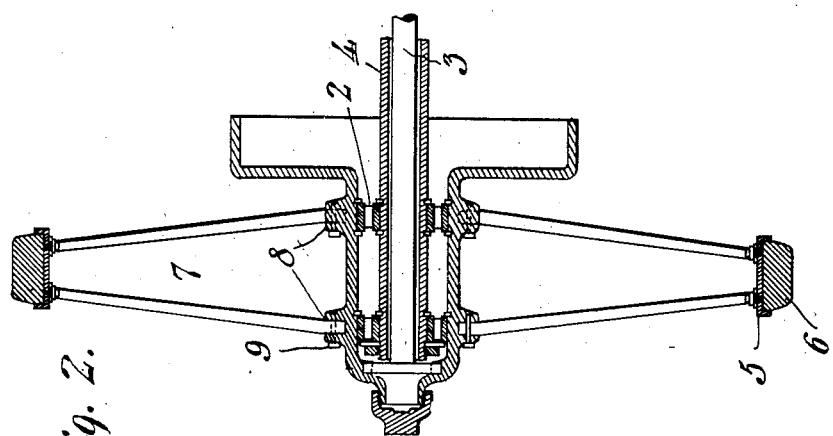

H. D. BOWMAN.
SPRING WHEEL.
APPLICATION FILED NOV. 27, 1918.

1,376,795.

Patented May 3, 1921.

Inventor:
Horace D. Bowman
By
His Attorney.

UNITED STATES PATENT OFFICE.

HORACE D. BOWMAN, OF SALT LAKE CITY, UTAH.

SPRING-WHEEL.

1,376,795. Specification of Letters Patent. Patented May 3, 1921.

Application filed November 27, 1918. Serial No. 264,381.

*To all whom it may concern:*

Be it known that I, HORACE D. BOWMAN, a citizen of the United States, residing at Salt Lake City, in the county of Salt Lake and State of Utah, have invented certain new and useful Improvements in Spring-Wheels, of which the following is a specification.

This invention relates to spring wheels of that general class embodying resilient spokes forming the sole connection between the hub and the rim.

The object of the invention is to obtain a maximum resiliency, reduce the unsprung weight to a minimum, and provide adequate strength to resist buckling, without increasing the weight beyond practical limits.

The invention embodies resilient spokes which are fastened rigidly to the hub and are inserted when under tension, the spokes being of parabolic form, originating at the hub in radial relation thereto and tapering and fixedly secured to the rim in substantially tangential relation thereto, the spokes being arranged in two sets lying in different planes; the members of one set may be staggered in relation to those of the other set, that is, arranged opposite the spaces between those of the other set.

The invention is not limited to any specific means for fastening the spokes to the hub, nor to a specific fastening for connecting them to the rim or felly; nor is it essential to the invention that any particular rim, or tire, be used, though a spring steel rim is advantageous.

The invention is set forth hereinafter and its novel features and relationship of parts are embodied in the appended claim.

Figure 1:
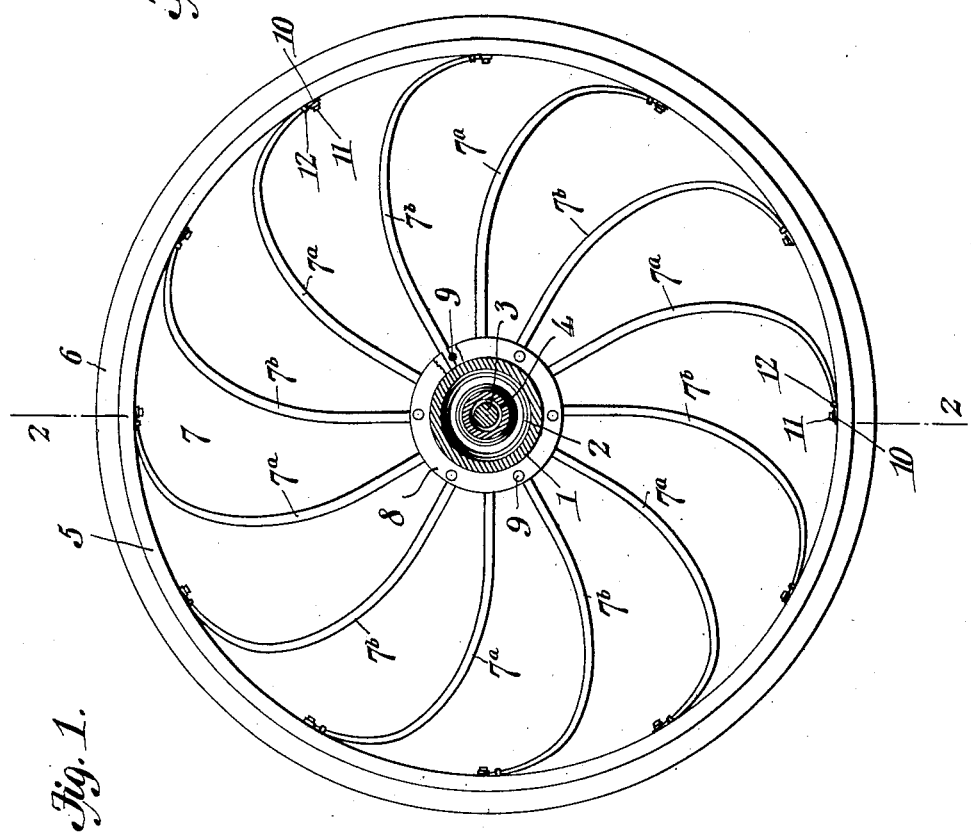

In the drawings,

Figure 1 is a side elevation, and

Fig. 2, a vertical section on line 2—2 of Fig. 1.

While the invention embodies the essential features hereinbefore specified, it is not limited to the exact details disclosed in the drawings.

The hub 1 may be of any desired form and provided with any preferred internal ball or roller bearings or axle arrangement, as these features constitute no part of the invention. Roller bearings are shown, generally, at 2, the axle at 3 and the fixed shell or tube surrounding the axle, at 4.

Any desired or preferred felly 5 and tire 6 may be used; a spring steel felly or rim is advantageous.

The invention resides in the form and relationship of spokes 7 to the hub 1 and felly 5. The spokes 7 may be of flat metal of substantially parabolic form, although not necessarily mathematically so, which are thickest at their inner portion, thence tapering, as to thickness, to their outer ends. The inner ends of the spokes 7 may be secured to either the hub 1 or rim 5, or both while under tension. The hub may have sockets 8 into which the ends of the spokes 7 snugly fit and are secured by pins or bolts 9 carried by the hub and engaging transverse notches in the ends of the spokes. The spokes are so set that their innermost portions are arranged substantially radially in relation to the hub 1 and the axle 3. The spokes are intended to be rigidly secured to the hub and to have no movement where they are fastened in the sockets 8 by the pins or bolts 9.

Beginning at a point not far distant from the hub, the spokes begin to curve and they are tapered, as to thickness, or width, or both to their terminal portions 10 which are fastened in any suitable manner, as by bolts 11 and shackles or clips 12, to the inner face of the felly or rim 5. These fastenings rigidly secure the terminals of the spokes to the rim and the parabolic form of the spokes disposes their terminal portions substantially tangential to the rim or felly 5.

The spokes 7 are arranged in two sets lying in different planes, that is to say, the respective sockets 8 for the different sets are located at different points lengthwise of the hub 1, and the points of fastening of the spokes to the rim or felly 5 are laterally offset, as shown in Fig. 2. The spokes may alternate or be arranged in staggered relation, that is to say, the spokes indicated 7ª are at one side of the wheel, and those indicated 7ᵇ are at the other side of the wheel, but all of the spokes of both sets are similarly formed and their terminals 10 all point in the same direction, for instance, to the right of Fig. 1.

By providing two rows of spokes, with those of one row set opposite the spaces of those of the other row, the rows being spaced apart as shown in Fig. 2, the wheel is given great strength to resist lateral buckling or flexing, and yet the resiliency of the wheel, in a vertical plane, is not interfered with. At the same time, the weight is not increased over that of a spring wheel wherein all of the spokes are arranged in a single plane.

By providing spokes which are tapered, as indicated, they may be bent into parabolic form, thus providing maximum flexibility at a point nearer the rim, this being desirable to provide the greatest resiliency possible in such a design, and to reduce the unsprung weight to a minimum. The spokes being inserted in the hub, or rim, or both while under tension, and having no movement at their points of connection either to the hub or to the rim or felly, in connection with the parabolic shape of the spokes and the tangential relation of their outer terminals to the felly, eliminates lost motion and makes the wheel flexible up and down in a vertical plane at all times, without possibility of lateral bending or buckling.

The spokes may be of metal which is rectangular in cross-sectional shape. They may be square in the region of the hub, tapering as to one or both dimensions, either square or rectangular or flat, oval, or of other form where meeting the rim.

What I claim is:—

A spring wheel comprising a hub, a felly, resilient spokes of substantially parabolic form rigidly secured to both the hub and felly, said spokes being arranged radially in relation to the hub, thence curving and tapering to their outer terminal portions and at their outer terminal portions being disposed tangentially to the felly, said spokes being arranged in two sets, the spokes of one set being spaced from those of the other set transversely to the median plane of the wheel where said spokes are connected to the hub and also where they are connected to the felly, and being disposed opposite the spaces between the spokes of the other set.

In testimony whereof I affix my signature.

HORACE D. BOWMAN.